US009671015B2

United States Patent
Kinoshita

(10) Patent No.: US 9,671,015 B2
(45) Date of Patent: Jun. 6, 2017

(54) ABNORMALITY DETECTION DEVICE FOR CONTINUOUSLY VARIABLE TRANSMISSION AND METHOD OF DETECTING ABNORMALITY OF THE CONTINUOUSLY VARIABLE TRANSMISSION

(71) Applicant: Fuji Jukogyo Kabushiki Kaisha, Tokyo (JP)

(72) Inventor: Takahiro Kinoshita, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 58 days.

(21) Appl. No.: 14/592,782

(22) Filed: Jan. 8, 2015

(65) Prior Publication Data

US 2015/0204440 A1    Jul. 23, 2015

(30) Foreign Application Priority Data

Jan. 23, 2014  (JP) ................................. 2014-010011

(51) Int. Cl.
*F16H 61/12*    (2010.01)
*B60W 10/06*    (2006.01)
(Continued)

(52) U.S. Cl.
CPC ............. *F16H 61/12* (2013.01); *B60W 10/06* (2013.01); *B60W 10/101* (2013.01);
(Continued)

(58) Field of Classification Search
CPC .. B60W 10/06; B60W 10/101; B60W 10/107; B60W 2510/0604;
(Continued)

(56) References Cited

U.S. PATENT DOCUMENTS 4,515,040 A * 5/1985 Takeuchi .............. B60W 10/06
477/43
6,328,671 B1 * 12/2001 Nakajima .............. B60K 6/485
180/65.26
(Continued)

FOREIGN PATENT DOCUMENTS

JP    2001-130288 A    5/2001
JP    2001-225672 A    8/2001
JP    2004-092522 A    3/2004

*Primary Examiner* — Ramya Burgess
*Assistant Examiner* — David Morris
(74) *Attorney, Agent, or Firm* — McGinn IP Law Group, PLLC.

(57) ABSTRACT

An abnormality detection device includes: a torque upper limit setting module that sets an upper limit of torque based on an allowable input torque for the continuously variable transmission, the upper limit of torque limiting an output torque of an engine; a determination torque calculation module that determines an acceleration requested by a driver based on an amount of operation of an accelerator, obtains a running resistance of a vehicle according to the requested acceleration, and calculates a determination torque for determining abnormality of the upper limit of torque based on the running resistance of the vehicle and a gear ratio of the continuously variable transmission; and an abnormality determination module that determines the upper limit of torque to be abnormal in the case where the upper limit of torque is less than or equal to the determination torque.

11 Claims, 2 Drawing Sheets

(51) Int. Cl.
  *B60W 10/101*  (2012.01)
  *F16H 61/66*  (2006.01)
  *B60W 50/038*  (2012.01)
  *B60W 50/04*  (2006.01)
  *F16H 61/662*  (2006.01)
  *B60W 50/02*  (2012.01)

(52) U.S. Cl.
  CPC .......... *B60W 50/038* (2013.01); *B60W 50/04* (2013.01); *F16H 61/66* (2013.01); *B60W 2050/022* (2013.01); *B60W 2510/0657* (2013.01); *B60W 2510/104* (2013.01); *B60W 2510/1005* (2013.01); *B60W 2510/1015* (2013.01); *B60W 2520/10* (2013.01); *B60W 2520/105* (2013.01); *B60W 2530/16* (2013.01); *B60W 2540/10* (2013.01); *B60Y 2400/72* (2013.01); *F16H 61/662* (2013.01); *F16H 2061/1268* (2013.01); *F16H 2061/6611* (2013.01)

(58) Field of Classification Search
  CPC ... B60W 2510/1005; B60W 2710/0666; F16H 61/12; F16H 61/66
  See application file for complete search history.

(56) References Cited

U.S. PATENT DOCUMENTS

| | | | |
|---|---|---|---|
| 6,896,639 B2 * | 5/2005 | Kang | B60W 10/02 477/107 |
| 6,923,158 B2 * | 8/2005 | Kang | F16H 61/66 123/349 |
| 7,024,298 B2 * | 4/2006 | Oohori | B60W 10/06 180/197 |
| 8,292,782 B2 * | 10/2012 | Yamanaka | F16H 61/66272 477/102 |

* cited by examiner

ABNORMALITY DETECTION DEVICE FOR CONTINUOUSLY VARIABLE TRANSMISSION AND METHOD OF DETECTING ABNORMALITY OF THE CONTINUOUSLY VARIABLE TRANSMISSION

CROSS-REFERENCE TO RELATED APPLICATIONS

The present application claims priority from Japanese Patent Application No. 2014-010011 filed on Jan. 23, 2014, the entire contents of which are hereby incorporated by reference.

BACKGROUND

1. Technical Field

The present disclosure relates to an abnormality detection device for a continuously variable transmission and a method of detecting abnormality of the continuously variable transmission.

2. Related Art

These days, continuously variable transmissions (CVT) such as a chain-type CVT or a belt-type CVT, which allow a gear ratio to be continuously changed, are widely in practical use (see, for example, Japanese Unexamined Patent Application Publication (JP-A) No. 2001-225672). In the continuously variable transmission described in JP-A No. 2001-225672, in order to suppress the degradation of power characteristics and a sense of discomfort due to a difference in responsiveness between the engine and the continuously variable transmission, transmission control of the continuously variable transmission is performed according to a target output which is calculated based on an accelerator opening and a vehicle speed. On the other hand, smoothing processing is performed on the target engine torque which is calculated from the target output, and the output of the engine is controlled based on the target engine torque which has undergone the smoothing processing.

While, as described above, the engine output torque is limited in order to absorb the difference in responsiveness between the engine and the continuously variable transmission, the engine output torque is also limited, for example, in order to protect the continuously variable transmission (for example, to prevent the chain from sliding, to prevent the clutch from being damaged, and/or to prevent input of torque greater than or equal to an allowable torque).

In general, the continuously variable transmission is controlled by an electrical control device using a microcomputer, for example. Although it is extremely rare for such an electrical control device to have a failure, a fault might occur in the microcomputer, for example, a fault in a memory such as a RAM and a register (for example, written data and read data do not match), a fault in a logical operation circuit, and variation in clock signal might occur. In addition, an error in setting or writing ROM data (such as control data) might occur.

If such a hardware related fault and/or an error in setting ROM data occurs, the above-described upper limit (limiting value) of torque output from the continuously variable transmission may have an abnormal value, the upper limit limiting the engine output torque. For example, in the case where the upper limit of torque has an abnormal value (for example, substantially zero) while the vehicle having such abnormality is being accelerated after an accelerator pedal is depressed, the vehicle is decelerated against the intention of the driver, that is, despite of the intention of accelerating the vehicle.

Thus, an occurrence of a failure as described above, a workaround for the failure is necessary such that control over the continuously variable transmission and the engine is not adversely affected. However, in the continuously variable transmission described in JP-A No. 2001-225672, detection of abnormality (determination of reasonableness) of the upper limit (limiting value) of torque, which limits the engine output torque, is not taken into consideration, the upper limit of torque being requested for the engine by the continuously variable transmission. Even when the upper limit of torque is same, the vehicle may be decelerated or may not be decelerated depending on, for example, a gear ratio, and thus it is not possible to determine whether or not the upper limit of torque is abnormal only by the value of the upper limit.

SUMMARY OF THE INVENTION

The present disclosure has been made to solve the above-described problems and provides an abnormality detection device for a continuously variable transmission and a method of detecting abnormality of the continuously variable transmission, the abnormality detection device being capable of detecting abnormality of an upper limit of torque which is requested for an engine by the continuously variable transmission, the upper limit of torque limiting an output torque of the engine.

An aspect of the present disclosure provides an abnormality detection device for a continuously variable transmission including: a setting module that sets an upper limit of torque based on an allowable input torque for the continuously variable transmission, the upper limit of torque limiting an output torque of an engine; a calculation module that determines an acceleration requested by a driver based on an amount of operation of an accelerator, obtains a running resistance of a vehicle according to the requested acceleration, and calculates a determination torque for determining abnormality of the upper limit of torque based on the running resistance of the vehicle and a gear ratio of the continuously variable transmission; and a determination module that determines the upper limit of torque to be abnormal in the case where the upper limit of torque set by the setting module is less than or equal to the determination torque calculated by the calculation module.

When obtaining the running resistance of the vehicle according to the requested acceleration, the calculation module may take a deceleration determination acceleration into consideration, the deceleration determination acceleration for determining whether or not the vehicle makes sudden deceleration higher than a predetermined deceleration.

The determination module may determine the upper limit of torque to be abnormal in the case where the upper limit of torque is less than or equal to the determination torque and the upper limit of torque is substantially equal to a target engine shaft torque set by an engine control unit.

The determination module may determine whether or not the upper limit of torque is abnormal when a vehicle speed is higher than or equal to a predetermined speed.

The determination module may determine the upper limit of torque to be abnormal in the case where a state, in which the upper limit of torque is determined to be abnormal, continues for a predetermined time or longer.

The abnormality detection device for a continuously variable transmission may further include an output module that outputs the upper limit of torque to the engine control unit, and in the case where the upper limit of torque is determined to be abnormal by the determination module, the output module stops outputting of the upper limit of torque to the engine control unit.

Another aspect of the present disclosure provides a method of detecting abnormality of the continuously variable transmission including: setting an upper limit of torque based on an allowable input torque for the continuously variable transmission, the upper limit of torque limiting an output torque of an engine; determining an acceleration requested by a driver based on an amount of operation of an accelerator, obtaining a running resistance of a vehicle according to the requested acceleration, and calculating a determination torque for determining abnormality of the upper limit of torque based on the running resistance of the vehicle and a gear ratio of the continuously variable transmission; and determining the upper limit of torque to be abnormal in the case where the upper limit of torque set in the setting is less than or equal to the determination torque calculated in the calculating.

DETAILED DESCRIPTION

Figure 1:
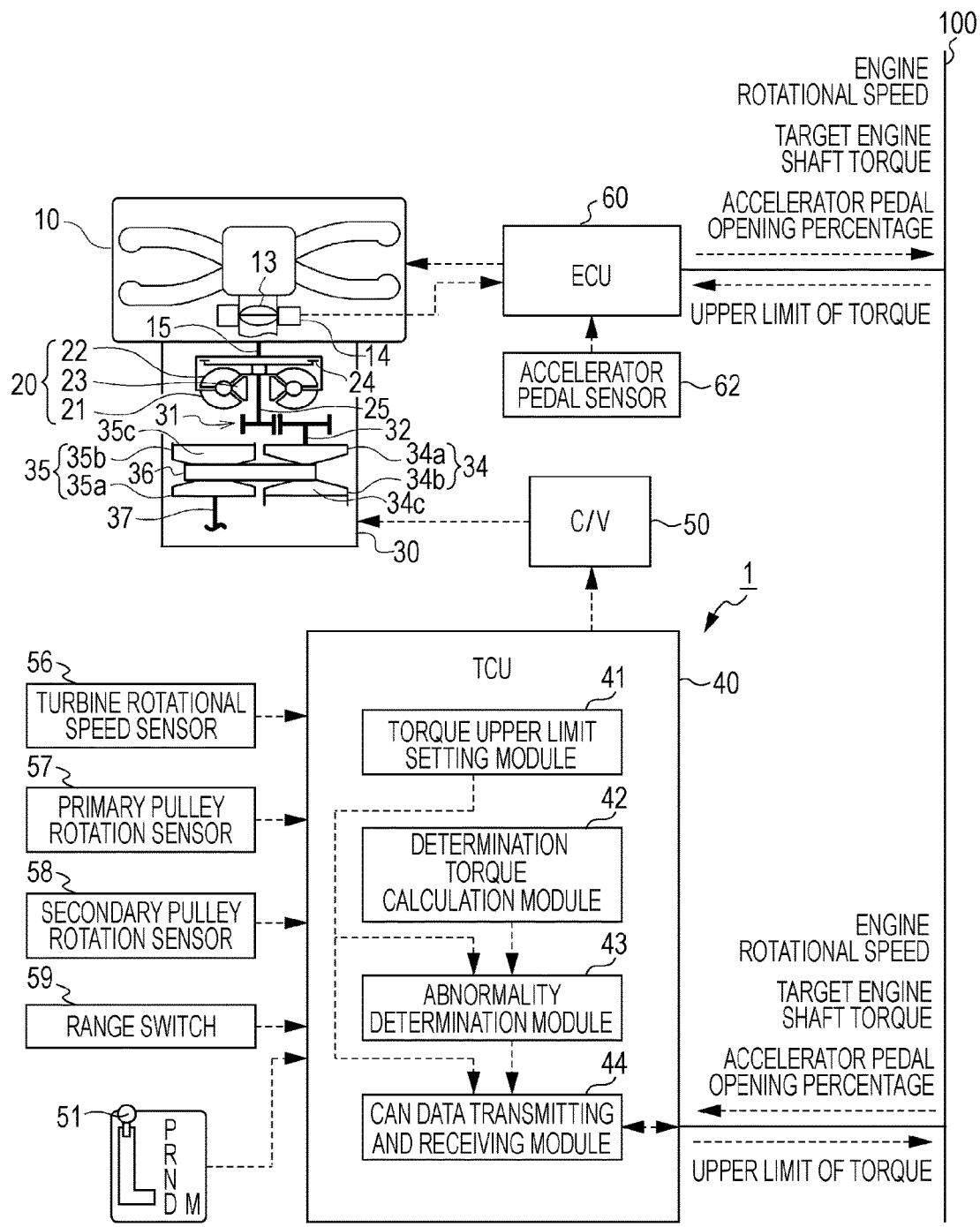
FIG. 1 is a block diagram illustrating the configuration of an abnormality detection device for a continuously variable transmission according to an implementation.

Hereinafter, a preferred implementation of the present disclosure will be described in detail with reference to the accompanying drawings. It is to be noted that the same or corresponding components in the drawings will be denoted by the same symbol. Also, the same elements in the drawings are labeled with the same symbols and a redundant description will be omitted.

First, the configuration of an abnormality detection device 1 for a continuously variable transmission according to the implementation will be described with reference to FIG. 1. FIG. 1 is a block diagram illustrating the configuration of the abnormality detection device 1 for a continuously variable transmission and a continuously variable transmission 30 to which the abnormality detection device 1 is applied.

An engine 10 may be of any type and the present implementation employs a horizontally-opposed four-cylinder direct-injection gasoline engine. In the engine 10, air sucked by an air cleaner (not illustrated) is throttled by an electronically controlled throttle valve (hereinafter referred to as a "throttle valve") 13 which is provided in an inlet pipe, and the air flows through an intake manifold and is sucked into each of the cylinders which are formed in the engine 10. Here, the amount of air sucked by the air cleaner is detected by an air flow meter. Furthermore, the throttle valve 13 is provided with a throttle opening sensor 14 that detects an opening of the throttle valve 13. An injector, which injects fuel, is mounted in each cylinder. In addition, a spark plug which ignites an air-fuel mixture, and an igniter built-in coil which applies a high voltage to the spark plug are mounted in each cylinder. In each cylinder of the engine 10, air-fuel mixture is ignited by the spark plug and burns, the air-fuel mixture including air sucked and fuel injected by the injector. The exhaust gas after combustion is discharged through an exhaust pipe.

In addition to the air flow meter and the throttle opening sensor 14 described above, a cam angle sensor for identifying cylinders of the engine 10 is mounted in the vicinity of the camshaft of the engine 10. Furthermore, a crank angle sensor for detecting a position of a crankshaft is mounted in the vicinity of the crankshaft of the engine 10. These sensors are connected to the below-described engine control unit (hereinafter referred to as "ECU") 60. The ECU 60 is also connected to various sensors such as an accelerator pedal sensor 62 that detects a depressed amount of an accelerator pedal, that is, the opening of the accelerator pedal, and a coolant temperature sensor that detects a temperature of coolant for the engine 10.

The output shaft 15 of the engine 10 is connected to a continuously variable transmission 30 that converts and outputs a driving force from the engine 10 via a torque converter 20 that has a clutch function and a torque amplifying function.

The torque converter 20 mainly includes a pump impeller 21, a turbine liner 22, and a stator 23. The pump impeller 21 connected to the output shaft 15 generates a flow of oil, and the turbine liner 22, which is disposed to face the pump impeller 21, receives force from the engine 10 via oil to drive an output shaft. The stator 23 located between the pump impeller 21 and the turbine liner 22 rectifies the discharge (return) flow from the turbine liner 22 and returns the flow to the pump impeller 21, thereby generating a torque amplifying effect.

The torque converter 20 also has a lock-up clutch 24 that sets the input and output in a directly connected state. When the lock-up clutch 24 is not engaged (in a non-lock-up state), the torque converter 20 increases the torque of the drive force from the engine 10 and transmits the increased torque to the continuously variable transmission 30, whereas when the lock-up clutch 24 is engaged (in a lock-up state), the torque converter 20 directly transmits the drive force from the engine 10 to the continuously variable transmission 30. The rotational speed (turbine rotational speed) of the turbine liner 22 included in the torque converter 20 is detected by a turbine rotational speed sensor 56. The detected turbine rotational speed is outputted to the below-described transmission control unit (hereinafter referred to as a "TCU") 40.

The continuously variable transmission 30 has a primary shaft 32 and a secondary shaft 37 disposed parallel to the primary shaft 32, the primary shaft being connected to an output shaft 25 of the torque converter 20 via a reduction gear 31.

The primary shaft 32 is provided with a primary pulley 34. The primary pulley 34 has a fixed pulley 34a connected to the primary shaft 32, and a movable pulley 34b which faces the fixed pulley 34a and is attached slidably in the axial direction of the primary shaft 32. Each of the pulleys 34a and 34b is designed to have a variable cone surface pitch, that is, a variable pulley groove width. On the other hand, the secondary shaft 37 is provided with a secondary pulley 35. The secondary pulley 35 has a fixed pulley 35a connected to the secondary shaft 37, and a movable pulley 35b which faces the fixed pulley 35a and is attached slidably in the axial direction of the secondary shaft 37. The secondary pulley 35 is designed to have a variable pulley groove width.

A chain 36 for transmitting drive force is suspended between the primary pulley 34 and the secondary pulley 35. The groove width of each of the primary pulley 34 and the secondary pulley 35 is changed so that a ratio (pulley ratio) of a winding radius of the chain 36 to each pulley 34, 35 is changed, thereby changing the gear ratio continuously. Here, the gear ratio i is expressed by i=Rs/Rp, where Rp is the winding radius of the chain 36 to the primary pulley 34 and Rs is the winding radius of the chain 36 to the secondary pulley 35. Therefore, the gear ratio i is determined by dividing a primary pulley rotation speed Np by a secondary pulley rotational speed Ns (i=Np/Ns).

The primary pulley 34 (movable pulley 34b) includes a hydraulic chamber 34c. On the other hand, the secondary pulley 35 (movable pulley 35b) includes a hydraulic chamber 35c. The groove width of each of the primary pulley 34 and the secondary pulley 35 is set and changed by adjusting a primary hydraulic pressure and a secondary hydraulic pressure, the primary hydraulic pressure being introduced into the hydraulic chamber 34c of the primary pulley 34, the secondary hydraulic pressure being introduced into the hydraulic chamber 35c of the secondary pulley 35.

The hydraulic pressure for shifting the continuously variable transmission 30, that is, the above-mentioned primary hydraulic pressure and secondary hydraulic pressure are controlled by a valve body (control valve) 50. The valve body 50 uses a spool valve and a solenoid valve (electromagnetic valve) for actuating the spool valve to open and close an oil passage which is formed in the valve body 50, thereby adjusting the hydraulic pressure discharged from an oil pump and supplying the adjusted hydraulic pressure to the hydraulic pressure chamber 34c of the primary pulley 34 and the hydraulic pressure chamber 35c of the secondary pulley 35. In addition, the valve body 50 also supplies a hydraulic pressure, for example, to a forward/reverse switching mechanism for switching between forwarding and reversing the vehicle.

Here, the floor (center console) of the vehicle is provided with a shift lever (select lever) 51 to receive an operation by a driver for selectively switching between an automatic transmission mode ("D" range) and a manual transmission mode ("M" range). The shift lever 51 is provided with a range switch 59 which is connected thereto to operate in coordination with the shift lever 51 and which detects a selection position of the shift lever 51. The range switch 59 is connected to the TCU 40 and the detected selection position of the shift lever 51 is read into the TCU 40. It is to be noted that in addition to the "D" range and the "M" range, the shift lever 51 allows selectable switching between parking "P" range, reverse "R" range, and neutral "N" range. It is to be noted that the TCU 40 is also connected to a primary pulley rotation sensor 57 that detects a rotational speed of the primary pulley 34 and a secondary pulley rotation sensor (vehicle speed sensor) 58 that detects a rotational speed of the secondary pulley 35.

The transmission control of the continuously variable transmission 30 is performed by the TCU 40. That is, the TCU 40 controls the drive of a solenoid valve (electromagnetic valve) included in the valve body 50 described above, thereby adjusting the hydraulic pressure supplied to the hydraulic pressure chamber 34c of the primary pulley 34 and the hydraulic pressure chamber 35c of the secondary pulley 35 and changing the gear ratio of the continuously variable transmission 30.

The TCU 40 is communicably connected to the ECU 60 via, for example, a controller area network (CAN) 100, the ECU 60 for comprehensively controlling the engine 10.

The TCU 40 and ECU 60 each include a microprocessor for performing calculation, a ROM for storing programs that cause the microprocessor to execute processing, a RAM for storing various data such as results of the calculation, a backup RAM for saving the stored content with a 12V battery, and an input and output I/F.

The ECU 60 identifies each cylinder based on the output of the above-described cam angle sensor, and determines an engine rotational speed from a change in rotational position of the crankshaft, the rotational position being detected by the output of the crank angle sensor. Also, the ECU 60 obtains various pieces of information such as a suction air amount, an accelerator pedal opening, an air-fuel ratio of air-fuel mixture, and a coolant temperature based on detection signals inputted from the above-described various sensors. The ECU 60 then controls an amount of fuel injection, an ignition timing, and various devices such as the throttle valve 13 based on these obtained various pieces of information, thereby controlling the engine 10 comprehensively.

In addition, the ECU 60 transmits information to the TCU 40 via the CAN 100, the information including an engine rotational speed, a target engine shaft torque, and an accelerator pedal opening (or an accelerator pedal opening percentage, that is, the percentage of actual accelerator opening with respect to full open). On the other hand, the ECU 60 receives an upper limit of torque (the details will be described later) from the TCU 40 via the CAN 100, the upper limit of torque limiting the output torque of the engine 10. Based on the upper limit of torque (or the least limiting value between torque limitations when other modules request the torque limitations) received from the TCU 40, the ECU 60 controls the output torque of the engine 10 so that the output torque (target engine shaft torque) of the engine 10 does not exceed the upper limit of torque. For example, the ECU 60 corrects the opening of the throttle valve 13 and adjusts the output torque of the engine 10 according to the upper limit of torque.

The TCU 40 continuously changes the gear ratio automatically according to an operational state (for example, the accelerator pedal opening and the vehicle speed) of the vehicle based on a transmission map. It is to be noted that a transmission map corresponding to the automatic transmission mode is stored in the ROM in the TCU 40.

Particularly, the TCU 40 has a function of detecting abnormality (that is, determining reasonableness) of an upper limit (limiting value) of torque demanded from the continuously variable transmission 30 to the engine 10, the upper limit of torque limiting the output torque of the engine 10. Thus, the TCU 40 functionally includes a torque upper limit setting module 41, a determination torque calculation module 42, an abnormality determination module 43, and a CAN data transmitting and receiving module 44. In the TCU 40, programs stored in the ROM are executed by a microprocessor, thereby achieving each of the functions of the torque upper limit setting module 41, the determination torque calculation module 42, the abnormality determination module 43, and the CAN data transmitting and receiving module 44.

The torque upper limit setting module 41 sets an upper limit of torque based on allowable input torque (torque which may be received) for the continuously variable transmission 30, the upper limit of torque limiting the output torque of the engine 10. That is, the torque upper limit setting module 41 functions as the setting module described in the appended claims. More specifically, the torque upper limit setting module 41 sets an upper limit of torque according to an operational state (for example, a vehicle speed and the gear ratio) of the continuously variable transmission 30 so as to protect the continuously variable transmission 30 (to prevent the chain 36 from sliding, to prevent the clutch from being damaged, and/or to prevent input of torque greater than or equal to an allowable torque). The upper limit of torque set by the torque upper limit setting module 41 is outputted to the abnormality determination module 43 and the CAN data transmitting and receiving module 44.

The determination torque calculation module 42 determines an acceleration requested by a driver based on an amount of operation of an accelerator (depressed amount of the accelerator pedal, that is, the opening of the accelerator pedal or (the opening percentage of the accelerator pedal)), obtains a running resistance of the vehicle according to the requested acceleration, and calculates a determination torque for determining abnormality of the upper limit of torque based on the running resistance of the vehicle and the gear ratio of the continuously variable transmission 30. In addition, the determination torque calculation module 42, when obtaining the running resistance of the vehicle according to the requested acceleration, takes a sudden deceleration determination acceleration into consideration, the deceleration determination acceleration for determining whether or not the vehicle experiences sudden deceleration higher than a predetermined deceleration. That is, the determination torque calculation module 42 functions as the calculation module described in the appended claims.

More specifically, the determination torque calculation module 42 calculates a determination torque [N·m] based on the following Expression (1).

determination torque=primary input torque÷torque converter torque ratio+ATF pump torque  (1)

The primary input torque [N·m] is calculated based on Expression (1.1) below, the torque converter torque ratio is calculated based on Expression (1.2) below, and the ATF pump torque [N·m] is calculated based on Expression (1.3) below.

primary input torque=running resistance=actual gear ratio÷final gear ratio÷reduction gear ratio×radius of tire  (1.1)

The running resistance [N] is calculated based on Expression (1.1.1) below. The design values of the final gear ratio, the reduction gear ratio, the radius of tire are stored as data.

torque converter torque ratio=torque converter torque ratio table (torque converter speed ratio)  (1.2)

The torque converter torque ratio table is a data table that defines the relationship between torque converter speed ratio and torque converter torque ratio (torque amplification ratio). The torque converter speed ratio is calculated based on Expression (1.2.1) below.

ATF pump torque=ATF pump torque map (engine rotational speed, secondary pulley pressure)  (1.3)

The ATF pump torque map is a data map that defines the relationship between engine rotational speed [rpm], secondary pulley pressure, and ATF pump torque.

running resistance=acceleration resistance+air resistance+rolling resistance  (1.1.1)

The acceleration resistance [N] is calculated based on Expression (1.1.1.1) below, the air resistance [N] is calculated based on Expression (1.1.1.2) below, and the rolling resistance [N] is calculated based on Expression (1.1.1.3) below.

torque converter speed ratio=turbine rotational speed ÷engine rotational speed  (1.2.1)

acceleration resistance=vehicle weight×(accelerator requested acceleration+sudden deceleration determination acceleration)  (1.1.1.1)

The design value of vehicle weight [kg] is stored as data.

The accelerator requested acceleration [m/s$^2$] is calculated based on Expression (1.1.1.1.1) below. The sudden deceleration determination acceleration is set to, for example, "−3 [m/s$^2$]". It is to be noted that the sudden deceleration determination acceleration corresponds to the deceleration determination acceleration described in the appended claims.

air resistance=vehicle speed [m/s]$^2$×value of CD×air density × frontal projected area÷2  (1.1.1.2)

The design values of CD and the frontal projected area [m$^2$] are stored as data. Also, the value of air density [kg/m$^3$] at a normal temperature (20° C.) is stored as data.

rolling resistance=rolling resistance coefficient×vehicle weight × gravitational acceleration [m/s$^2$]  (1.1.1.3)

For example, a typical fixed value may be stored as data of the rolling resistance or the value of rolling resistance may be selectively changed according to road surface conditions (for example, gravel road or snowy road conditions).

accelerator requested acceleration=accelerator requested acceleration table (accelerator pedal opening percentage)  (1.1.1.1.1)

The accelerator requested acceleration table is a table that defines the relationship between accelerator pedal opening percentage [%] (the percentage of actual accelerator opening with respect to full open) and accelerator requested acceleration (which corresponds to the acceleration requested by a driver described in the appended claims). It is to be noted that instead of the accelerator pedal opening percentage, the accelerator pedal opening may be used. In this manner, the determination torque, which is calculated by the determination torque calculation module 42, is outputted to the abnormality determination module 43.

The abnormality determination module 43 determines an upper limit of torque set by the torque upper limit setting module 41 to be abnormal when the upper limit of torque is equal to or substantially equal to the target engine shaft torque set by the ECU 60 (the deviation between the torques is less than or equal to a predetermined value), that is, (the target engine shaft torque is limited by the upper limit of torque), and the upper limit of torque is less than or equal to the determination torque calculated by the determination torque calculation module 42. The abnormality determination module 43 functions as the determination module described in the appended claims.

It is to be noted that the abnormality determination module 43 determines whether or not an upper limit of torque is abnormal when the vehicle speed is higher than or equal to a predetermined speed (for example, 20 km/h). The abnormality determination module 43 determines an upper limit of torque to be abnormal in the case where a state in which, the upper limit of torque is determined to be abnormal, has continued for a predetermined time or longer (for example, 500 msec). A result of the determination made by the abnormality determination module 43 is outputted to the CAN data transmitting and receiving module 44.

The CAN data transmitting and receiving module 44 transmits an upper limit of torque to the ECU 60 via the CAN 100, the upper limit of torque being set by the torque upper limit setting module 41. However, in the case where the upper limit of torque is determined to be abnormal by the abnormality determination module 43, the CAN data transmitting and receiving module 44 stops transmission via CAN, that is, stops transmission of the upper limit of torque to the ECU 60. The CAN data transmitting and receiving module 44 functions as the output module described in the appended claims. It is to be noted that the CAN data transmitting and receiving module 44 also receives CAN data (for example, an engine rotational speed, a target engine shaft torque, and an accelerator pedal opening percentage) which are transmitted from the ECU 60, for example.

Figure 2:
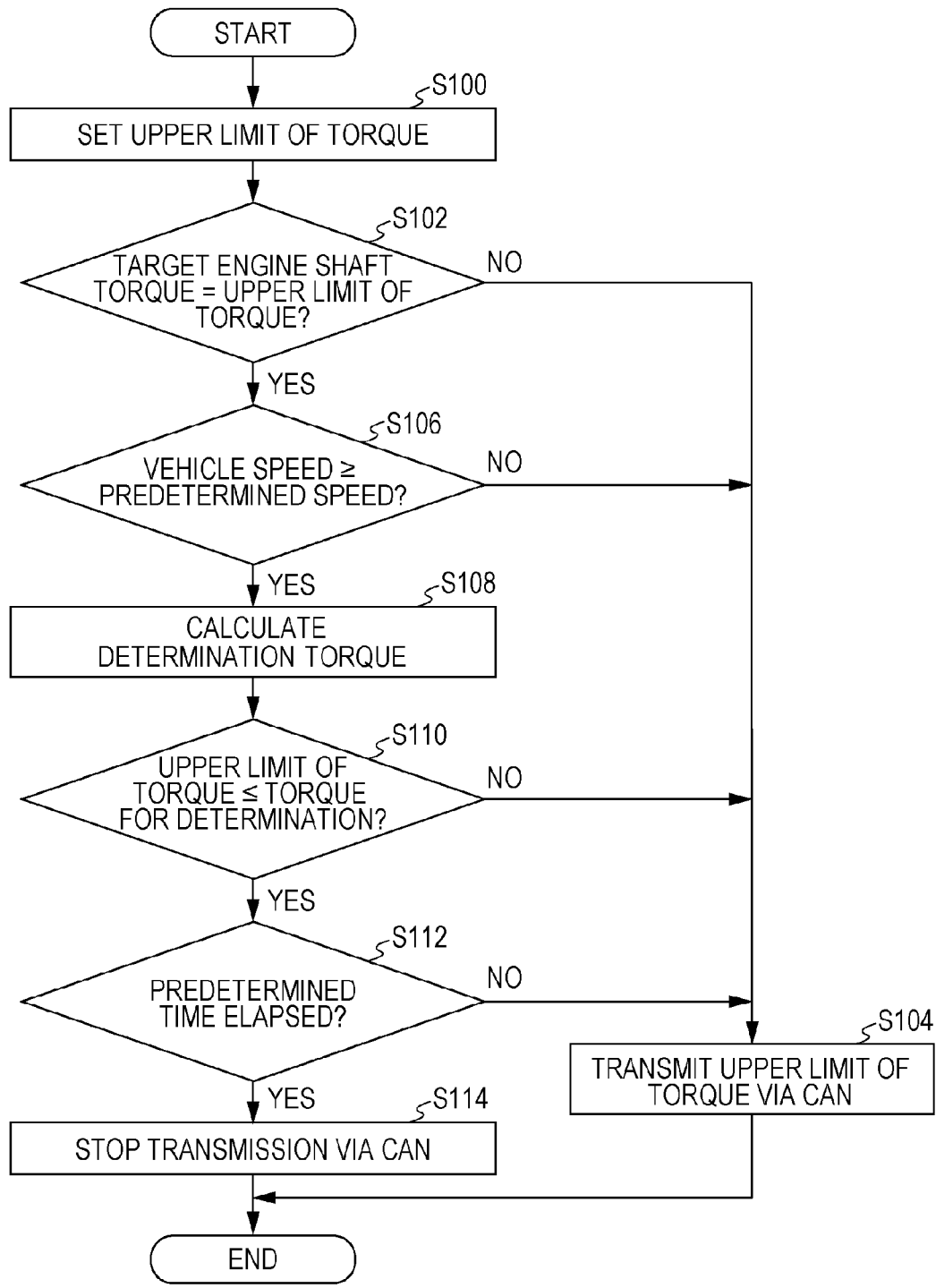
FIG. 2 is a flow chart illustrating the steps of abnormality detection processing performed by the abnormality detection device for a continuously variable transmission according to the implementation.

Next, the operation of the abnormality detection device 1 for a continuously variable transmission will be described with reference to FIG. 2. FIG. 2 is a flow chart illustrating the steps of abnormality detection (that is, reasonableness determination) processing performed by the abnormality detection device 1 for a continuously variable transmission. The processing is repeatedly performed by the TCU 40 for every predetermined time (for example, every 10 ms).

First, in step S100, an upper limit of torque for limiting the output torque of the engine 10 is set based on the allowable input torque for the continuously variable transmission 30. Next, in step S102, it is determined whether or not the upper limit of torque set in step S100 is equal to the target engine shaft torque set by the ECU 60.

When the upper limit of torque is equal to the target engine shaft torque, the processing flow proceeds to step S106. On the other hand, when the upper limit of torque is not equal to the target engine shaft torque, the upper limit of torque is transmitted to the ECU 60 via the CAN 100 in step S104, and the flow is exited.

In step S106, it is determined whether or not the vehicle speed is higher than or equal to a predetermined speed (for example, 20 km/h). When the vehicle speed is higher than or equal to the predetermined speed, the processing flow proceeds to step S108. On the other hand, when the vehicle speed is lower than the predetermined speed, the upper limit of torque is transmitted to the ECU 60 via the CAN 100 in step S104, and the flow is exited.

In step S108, a determination torque for detecting abnormality (that is, determining reasonableness) of the upper limit of torque is calculated. The method of calculating a determination torque is as described above, and thus detailed description will be omitted herein.

Subsequently, in step S110, it is determined whether or not the upper limit of torque set in step S100 is less than or equal to the determination torque calculated in step S108. When the upper limit of torque is less than or equal to the determination torque, the processing flow proceeds to step S112. On the other hand, when the upper limit of torque is greater than the determination torque, the upper limit of torque is transmitted to the ECU 60 via the CAN 100 in step S104, and the flow is exited.

In step S112, it is determined whether or not a state, in which the upper limit of torque is less than or equal to the determination torque(that is, abnormal state), has continued for a predetermined time or longer (for example, 500 msec). When an abnormal state has continued for the predetermined time or longer (that is, the current state is determined to be abnormal), the processing flow proceeds to step S114. On the other hand, when an abnormal state has not continued for the predetermined time or longer, the upper limit of torque is transmitted to the ECU 60 via the CAN 100 in step S104, and the flow is exited.

In step S114, transmission of data including the upper limit of torque via CAN is stopped, thereby preventing abnormal reduction in the output torque of the engine 10.

As described above in detail, according to the present implementation, an acceleration requested by a driver is determined based on the amount of operation of the accelerator, and a running resistance, for which the requested acceleration is satisfied, is obtained. Then based on the running resistance and the gear ratio, a determination torque for determining abnormality of the upper limit of torque, that is, an output torque of the engine 10 necessary for generating the acceleration requested by a driver is calculated. Thus, by comparing the upper limit of torque with the determination torque, it is possible to determine whether or not reasonableness of the upper limit of torque is satisfied, that is, the acceleration requested by a driver is satisfied (whether or not the vehicle is decelerated against the request for acceleration). That is, the upper limit of torque may be determined to be abnormal in the case where the upper limit of torque is less than or equal to the determination torque (in the case where the upper limit deviates from the determination torque). Thus, it is possible to detect abnormality (that is, determine reasonableness) of the upper limit of torque which is requested for the engine 10 by the continuously variable transmission 30, the upper limit limiting the output torque of the engine 10.

According to the present implementation, when a running resistance of a vehicle is obtained according to a requested acceleration, a deceleration determination acceleration is taken into consideration, the deceleration determination acceleration for determining whether or not the vehicle experiences sudden deceleration higher than a predetermined deceleration. Thus, it is possible to determine whether or not the upper limit of torque for limiting the output torque of the engine 10 has a value that may cause sudden deceleration which is not intended by a driver.

According to the present implementation, an upper limit of torque is determined to be abnormal when the upper limit of torque is less than or equal to the determination torque and is substantially equal to the target engine shaft torque set by the ECU 60. Therefore, it is possible to tell whether the target engine shaft torque of the engine 10 (the torque which is intended to be achieved by the engine 10) is limited by the upper limit of torque from the continuously variable transmission 30 or by another factor. Thus, it is possible to determine abnormality of an upper limit of torque when the upper limit of torque is substantially equal to the target engine shaft torque, that is, only when the engine output torque is limited by the upper limit of torque from the continuously variable transmission 30. It is to be noted that when the target engine shaft torque is less than the upper limit of torque, the output torque of the engine 10 is probably limited by another factor other than the limiting value (the upper limit of torque) from the continuously variable transmission 30.

According to the present implementation, when the vehicle speed is higher than or equal to a predetermined speed (for example, 20 km/h), it is determined whether or not the upper limit of torque is abnormal. Thus, when abnormal upper limit of torque causes decrease in the engine output torque, for example when a vehicle experiences deceleration which is not intended by a driver and has a speed higher than a potentially dangerous speed, abnormality determination is performed.

According to the present implementation, an upper limit of torque is determined to be abnormal in the case where a state in which, the upper limit of torque is determined to be abnormal, has continued for a predetermined time or longer (for example, 500 msec). Thus, an erroneous determination may be properly prevented.

According to the present implementation, when an upper limit of torque is determined to be abnormal, transmission of the upper limit of torque to the ECU 60 is stopped. Consequently, abnormal reduction in the engine output torque may be prevented, the abnormal reduction causing, for example, sudden deceleration which is not intended by a driver.

Although the implementation of the present disclosure has been described above, the present disclosure is not limited to the above-described implementation and various modifications are possible. For example, in the above-described implementation, the present disclosure has been applied to a chain-type continuously variable transmission (CVT). Alternatively, the present disclosure may be applied to, for example, a belt-type CVT or a toroidal-type CVT.

In the above implementation, the ECU 60 that controls the engine 10 and the TCU 40 that controls the continuously variable transmission 30 are each implemented by an individual hardware. Alternatively, the ECU 60 and the TCU 40 may be integrally implemented.

In the above implementation, the torque upper limit setting module 41, the determination torque calculation module 42, and the abnormality determination module 43 are implemented on the same CPU, and transmission via CAN is internally stopped in a software-controlled manner at the time of abnormality. Alternatively, the determination torque calculation module 42 and the abnormality determination module 43 may be implemented on a CPU or a supervisory IC which is different from that of the torque upper limit setting module 41 for example, and transmission via CAN may be externally stopped (a driver is stopped) in a hardware-controlled manner at the time of abnormality.

The invention claimed is:

1. An abnormality detection device for a continuously variable transmission, the abnormality detection device comprising:
   a setting module that sets an upper limit of torque based on an allowable input torque for the continuously variable transmission, the upper limit of torque limiting an output torque of an engine;
   a calculation module that determines an acceleration requested by a driver based on an amount of operation of an accelerator, obtains a running resistance of a vehicle according to the requested acceleration, and calculates a determination torque for comparison with the upper limit of torque to determine an abnormality based on the running resistance of the vehicle, a gear ratio of the continuously variable transmission, and the output torque of the engine required to generate the acceleration requested by the driver; and
   a determination module that determines the upper limit of torque to be abnormal in the case where the upper limit of torque set by the setting module is less than or equal to the determination torque calculated by the calculation module,
   wherein the calculation module obtains the running resistance by taking into account a predetermined deceleration amount representing a sudden deceleration of the vehicle.

2. The abnormality detection device according to claim 1, wherein the determination module determines the upper limit of torque to be abnormal in the case where the upper limit of torque is less than or equal to the determination torque and the upper limit of torque is substantially equal to a target engine shaft torque set by an engine control unit.

3. The abnormality detection device according to claim 2, wherein the determination module determines whether or not the upper limit of torque is abnormal when a vehicle speed is higher than or equal to a predetermined speed.

4. The abnormality detection device according to claim 2, wherein the determination module determines the upper limit of torque to be abnormal in the case where a state, in which the upper limit of torque is determined to be abnormal, continues for a predetermined time or longer.

5. The abnormality detection device according to claim 4, further comprising
   an output module that outputs the upper limit of torque to the engine control unit,
   wherein in the case where the upper limit of torque is determined to be abnormal by the determination module, the output module stops outputting of the upper limit of torque to the engine control unit.

6. The abnormality detection device according to claim 1, wherein the determination module determines whether or not the upper limit of torque is abnormal when a vehicle speed is higher than or equal to a predetermined speed.

7. The abnormality detection device according to claim 1, wherein the determination module determines the upper limit of torque to be abnormal in the case where a state, in which the upper limit of torque is determined to be abnormal, continues for a predetermined time or longer.

8. The abnormality detection device according to claim 7, further comprising
   an output module that outputs the upper limit of torque to an engine control unit,
   wherein in the case where the upper limit of torque is determined to be abnormal by the determination module, the output module stops outputting of the upper limit of torque to the engine control unit.

9. The abnormality detection device according to claim 1, wherein the setting module sets the upper limit of torque according to a vehicle speed and the gear ratio.

10. The abnormality detection device according to claim 1, further comprising an output module configured to stop outputting of the upper of torque to an engine control unit thereby allowing the determination torque to exceed upper limit of torque.

11. A method of detecting abnormality of a continuously variable transmission, the method comprising:
    setting an upper limit of torque based on an allowable input torque for the continuously variable transmission, the upper limit of torque limiting an output torque of an engine;
    determining if a target engine shaft torque equals the upper limit of torque;
    determining if a vehicle speed is greater than or equal to a predetermined speed;
    determining an acceleration requested by a driver based on an amount of operation of an accelerator, obtaining a running resistance of a vehicle according to the requested acceleration, and calculating a determination torque for comparison with the upper limit of torque to determine an abnormality based on the running resistance of the vehicle and a gear ratio of the continuously variable transmission, and the output torque of the engine required to generate the acceleration requested by the driver; and
    determining the upper limit of torque to be abnormal in the case where the upper limit of torque set in the setting is less than or equal to the determination torque calculated in the calculating,
    wherein the obtaining obtains the running resistance by taking into account a predetermined deceleration amount representing a sudden deceleration of the vehicle.

* * * * *